(12) United States Patent
Shih et al.

(10) Patent No.: US 8,502,744 B2
(45) Date of Patent: Aug. 6, 2013

(54) SCANNING ANTENNA

(75) Inventors: Yi-Chi Shih, Palos Verdes Estates, CA (US); Long Bui, Palos Verdes Estates, CA (US); Tom Rolfer, Andover, MN (US); Kiet Mai, Pasadena, CA (US); Yaozhong Liu, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 560 days.

(21) Appl. No.: 12/211,622

(22) Filed: Sep. 16, 2008

(65) Prior Publication Data
US 2010/0066620 A1    Mar. 18, 2010

(51) Int. Cl.
*H01Q 3/12*    (2006.01)
*H01Q 19/12*   (2006.01)

(52) U.S. Cl.
USPC ......... 343/761; 343/766; 343/781 P; 343/840

(58) Field of Classification Search
USPC ................. 343/761, 837, 839, 840, 757, 880, 343/882, 766, 781 P
See application file for complete search history.

(56) References Cited

U.S. PATENT DOCUMENTS

| | | | | |
|---|---|---|---|---|
| 2,531,454 A | * | 11/1950 | Marshall | 343/761 |
| 2,595,271 A | * | 5/1952 | Kline | 343/761 |
| 4,070,678 A | * | 1/1978 | Smedes | 343/754 |
| 4,193,693 A | * | 3/1980 | Frosch et al. | 356/452 |
| 4,665,401 A | | 5/1987 | Garrard | |
| 5,021,798 A | | 6/1991 | Ubhayakar | |
| 5,319,379 A | | 6/1994 | Waken et al. | |
| 6,307,522 B1 | | 10/2001 | Alexanian | |
| 6,359,599 B2 | | 3/2002 | Apostolos | |
| 6,769,194 B2 | | 8/2004 | Hennessey | |
| 6,856,277 B2 | | 2/2005 | Katayama et al. | |
| 6,965,784 B2 | | 11/2005 | Kanamaluru et al. | |
| 7,474,254 B2 | * | 1/2009 | White et al. | 342/74 |

FOREIGN PATENT DOCUMENTS

| EP | 0235932 A | 9/1987 |
|---|---|---|
| WO | 00/65370 A | 11/2000 |

OTHER PUBLICATIONS

Wolfgang Menzel et al., A 77-GHz FM/CW Radar Front-End with a Low-Profile Low-Loss Printed Antenna, IEEE Transactions on Microwave Theory and Techniques, vol. 47, No. 12, Dec. 1999, pp. 2237-2241.

* cited by examiner

*Primary Examiner* — Michael C Wimer
(74) *Attorney, Agent, or Firm* — Lowe Graham Jones PLLC

(57) ABSTRACT

A reflector assembly implementable in a scanning antenna assembly having a stationary surface includes a support assembly coupled to the stationary surface, a substantially planar first reflector panel coupled to the support assembly so as to enable rotation of the first reflector panel about a central axis of the first reflector panel, and an actuator assembly comprising a translating arm coupled to the first reflector panel, wherein translational motion of the arm is operable to rotate the first reflector panel about the central axis back and forth through a predetermined angular range at a predetermined frequency.

14 Claims, 7 Drawing Sheets

SCANNING ANTENNA

BACKGROUND OF THE INVENTION

Millimeter-wave image-based synthetic vision systems (SVS) for aircraft landing may require a +/−15 degree linearly scanning antenna in the azimuth direction, with an update rate of 100 ms or faster at 94 GHz. Conventional mechanical scanning assemblies using a crank rocker driver will provide an undesirable sinusoidal profile and can be bulky and not suitable for small platforms, which require a small compact assembly.

SUMMARY OF THE INVENTION

In an embodiment, a reflector assembly implementable in a scanning antenna assembly having a stationary surface includes a support assembly coupled to the stationary surface, a substantially planar first reflector panel coupled to the support assembly so as to enable rotation of the first reflector panel about a central axis of the first reflector panel, and an actuator assembly comprising a translating arm coupled to the first reflector panel, wherein translational motion of the arm is operable to rotate the first reflector panel about the central axis back and forth through a predetermined angular range at a predetermined frequency.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment includes a scalable linear scanning antenna, which may be a preferred solution for many platforms including small bizjets to meet size, weight, power, and production cost constraints.

An embodiment of the invention addresses the linear scanning profile in a compact, scalable mechanical scanning antenna using friction driven piezo electric motors. With the friction driven motors placed at the optimum location, the scanning mechanism can be very compact, and the design is scalable for different aperture sizes and scan rate. The piezo electric motor is very small and multiple motors can be used for higher torque if needed. Operating as a close-loop system, the antenna beam position is precisely controlled with an angular positional feedback optical encoder. Using a PID controller, the scanning profile is fully programmable. Instead of the normal sinusoidal profile, one can program an arbitrary profile to meet the specific system requirement. The friction drive mechanism can absorb high shocks and self-recover in rough take-offs and landings.

As discussed in greater detail below, an antenna according to an embodiment may include a feedhorn, a main parabolic reflector, and a scanning small, light-weight sub-reflector. In such a design, a horizontal polarized wave radiates from the feedhorn placed at the focal point of the parabolic reflector, is reflected, and becomes a vertically polarized wave, so as to pass through the main reflector with minimum loss. By rotating the sub-reflector, the beam will move in the same direction with twice the amplitude. Scanning can be accomplished by moving, in a linear fashion, the sub-reflector using, for example, compact friction-driven motors.

Figure 1:
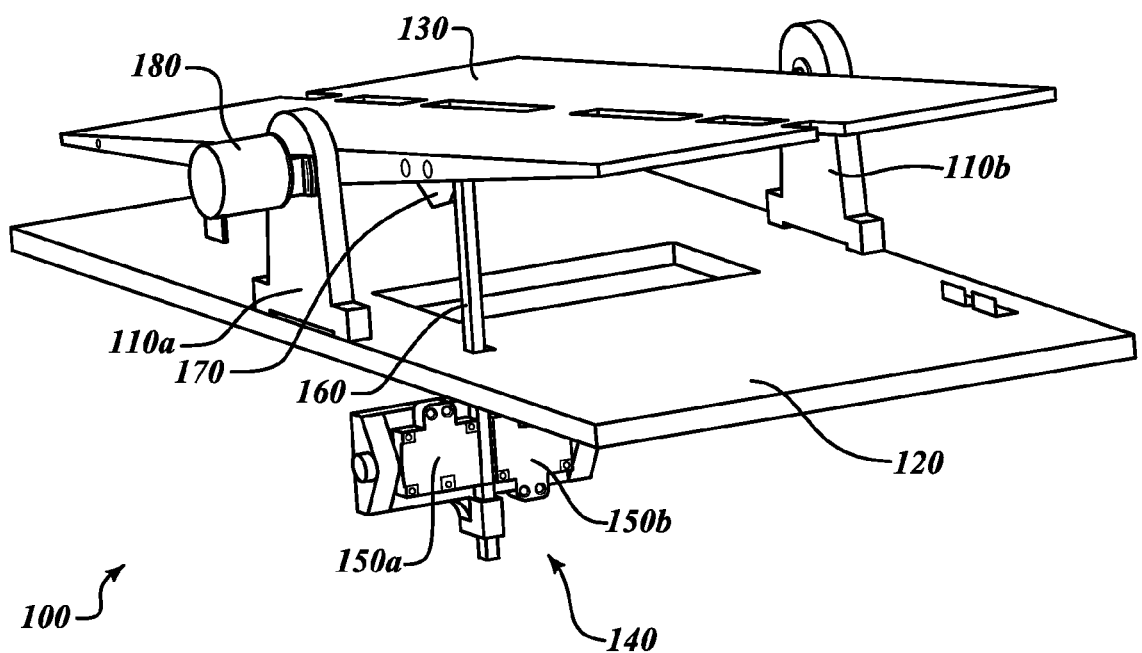
FIG. 1 is a first perspective plan view of a reflector assembly according to an embodiment of the invention.
Figure 2:
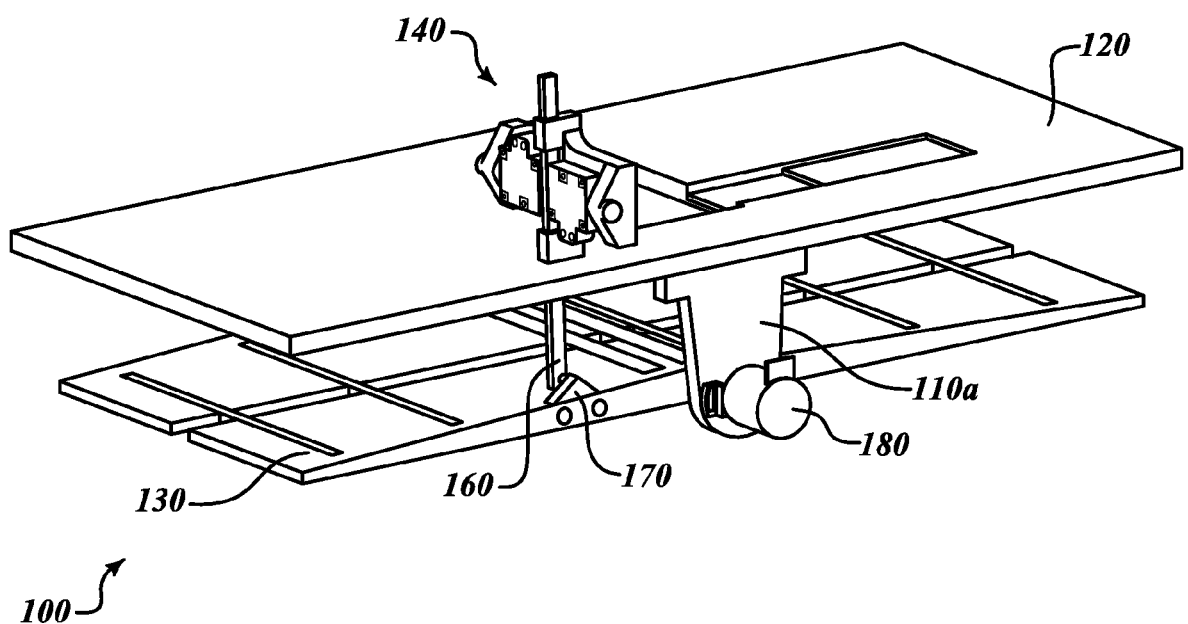
FIG. 2 is a second perspective plan view of a reflector assembly according to an embodiment of the invention.

Referring to FIGS. 1 and 2, illustrated is a reflector assembly 100 according to an embodiment of the invention. The reflector assembly 100 includes a support assembly 110, which, as illustrated, may include a pair of mounting brackets 110a, 110b. The support assembly 110 may be mounted to a stationary surface panel 120, which, as discussed in further detail below, may form a portion of a scanning-antenna housing. A substantially planar reflector panel 130 is mounted to the support assembly 110 in such a manner as to enable rotation of the reflector panel about its central axis, which passes through mounting brackets 110a, 110b.

An actuator assembly 140 is coupled to the reflector panel 130. In the illustrated embodiment, and as further illustrated in FIGS. 3 and 4, the actuator assembly 140 includes first and second piezoelectric motors 150a, 150b that cause an arm 160, which is coupled to the panel 130 via a hinge 170, to move linearly back and forth. Such translational motion of the arm 160 is operable to rotate the reflector panel 130 about the central axis back and forth through a predetermined angular range (e.g., in an embodiment, +/−7.5 degrees for a total motion of 15 degrees) at a predetermined frequency (e.g., 10 Hz). The actuator assembly 140 further includes an encoder sensor 180, which is, preferably, mounted to one of the mounting brackets 110a, 110b in such a way as to communicate with both the motors 150a, 150b and to sense/control the position and motion of the panel 130.

The arm 160 generally includes a traction surface, such as a strip of ceramic material, that is operated on by the motors 150a, 150b to move the arm 160 relative to the motors 150a, 150b. The encoder sensor 180 is used to determine the angular position of the substantially planar reflector panel 130 relative to the motors 150a, 150b. In accordance with an embodiment of the present invention, the encoder sensor 180 is a high-resolution angular positional feedback optical encoder.

Figure 3:
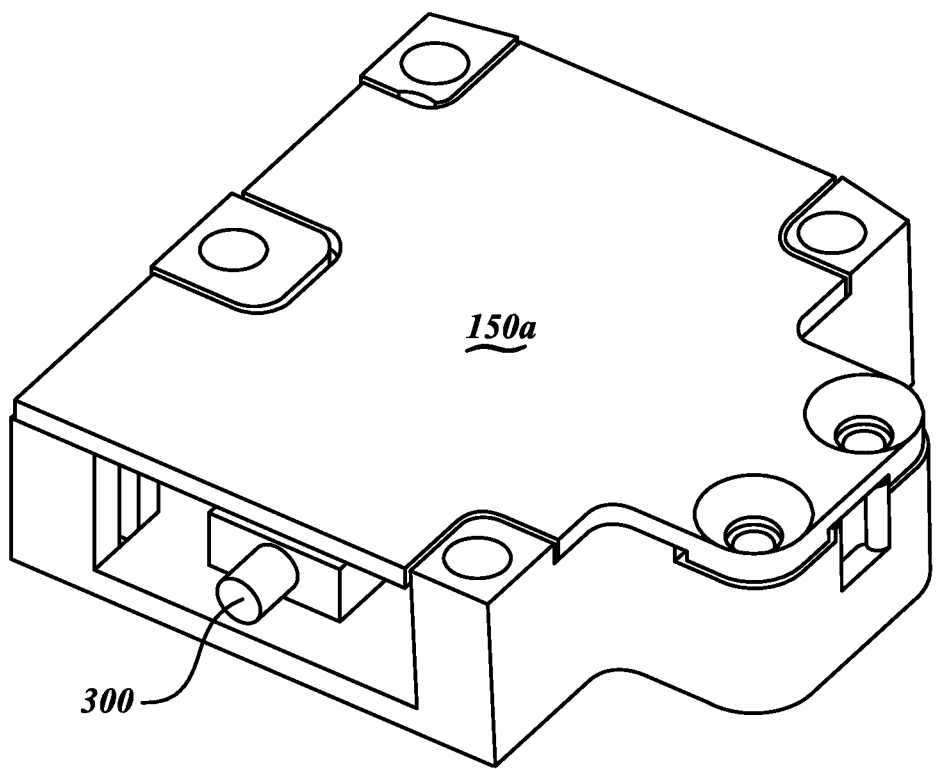
FIG. 3 is a perspective view of a motor according to an embodiment of the invention.
Figure 4:
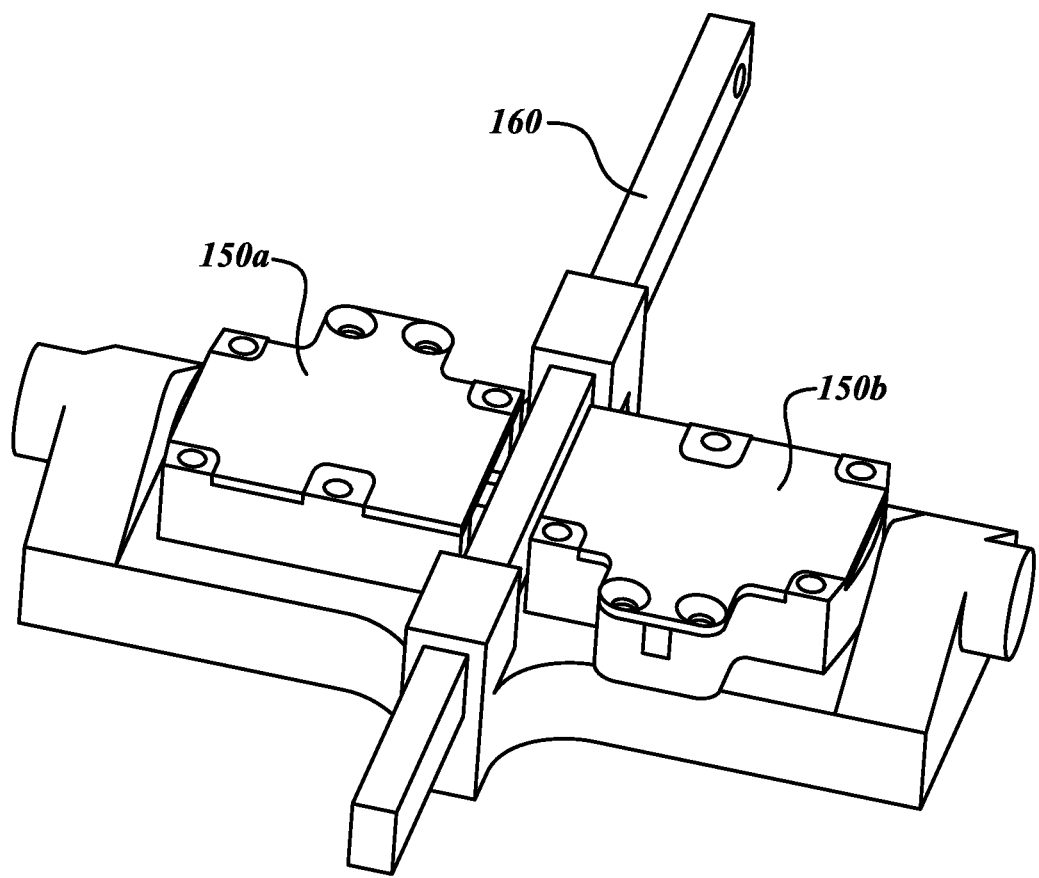
FIG. 4 is a perspective view of an actuator assembly according to an embodiment of the invention.

As best shown in FIG. 3, the motors 150a, 150b include a finger element 300 operable to contact the traction surface of the arm 160. The arm 160 is moved relative to the motors 150a, 150b by selectively exciting electrodes (not shown) associated with the motors such that each finger 300 acts upon the traction surface to move the arm 160 relative to the motors 150a, 150b back and forth linearly. Because the movement of the finger 300 is small, the movement of the arm 160 with respect to the motors 150a, 150b can be very precisely controlled. For additional description of a piezoelectric linear actuator suitable for use in connection with embodiments of the present invention, see U.S. Pat. No. 5,453,653, issued Sep. 26, 1995, and U.S. Pat. No. 5,616,980, issued Apr. 1, 1997, the entire disclosures of which are hereby incorporated herein by reference. In accordance with an embodiment of the present invention, the piezoelectric ceramic motors 150a, 150b are precision dual mode standing wave motors available from Nanomotion, Inc.

As an alternative to a dual mode standing wave motor, the piezoelectric linear motors 150a, 150b may comprise direct drive piezoelectric motors. Other motors 150a, 150b capable of providing the required repeatability include, but are not limited to, ceramic piezoelectric motors using lead screws.

Figure 5:
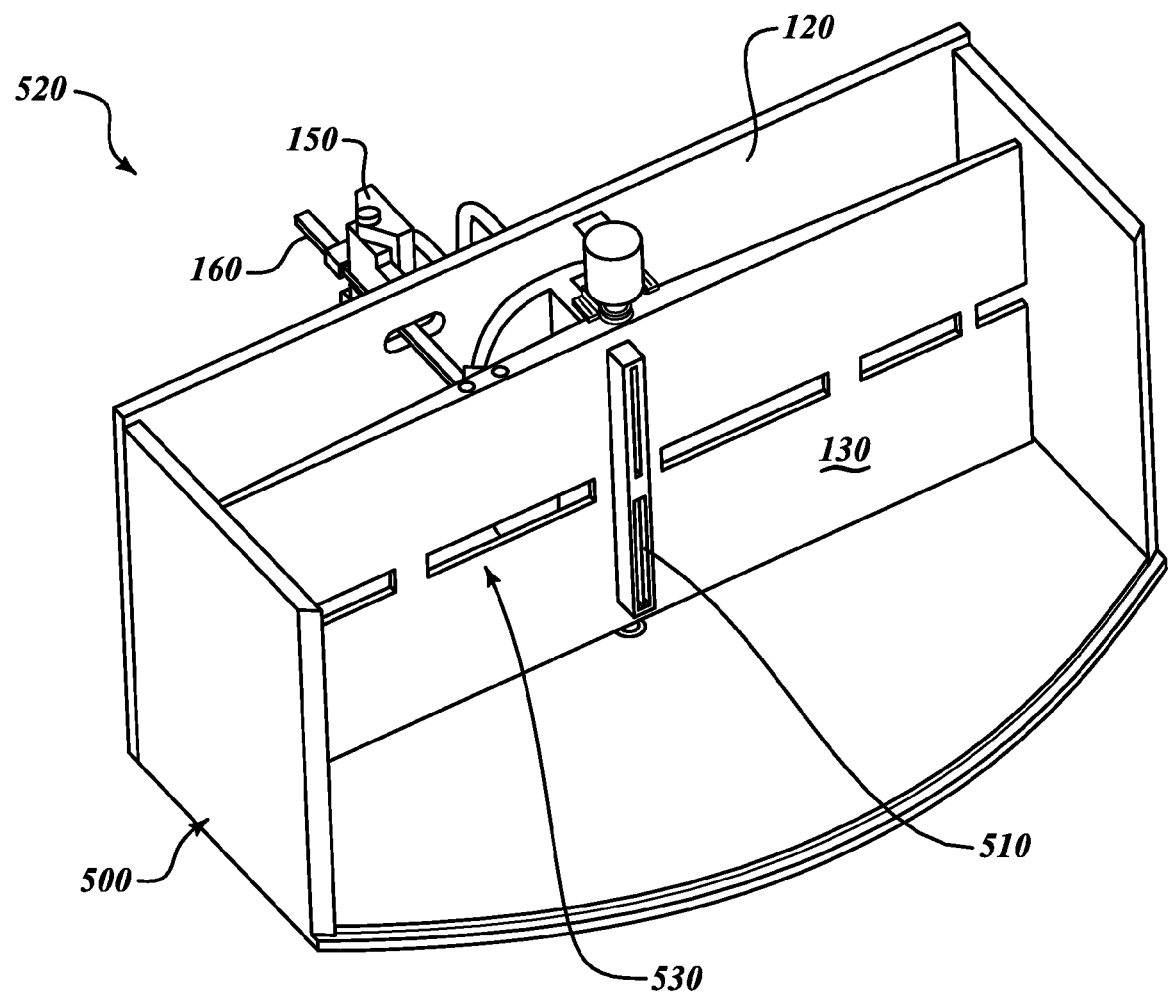
FIG. 5 is a first partial-cutaway perspective view of an antenna assembly according to an embodiment of the invention.

Referring now to FIG. 5, the reflector assembly 100 is shown coupled to and disposed within a housing 500 of a scanning antenna 520 according to an embodiment. As also illustrated in FIG. 5, the panel 130 is configured to receive, via a slot (not shown) or other appropriate configuration, a feedhorn 510 operable to transmit and/or receive electromagnetic signals.

Figure 6:
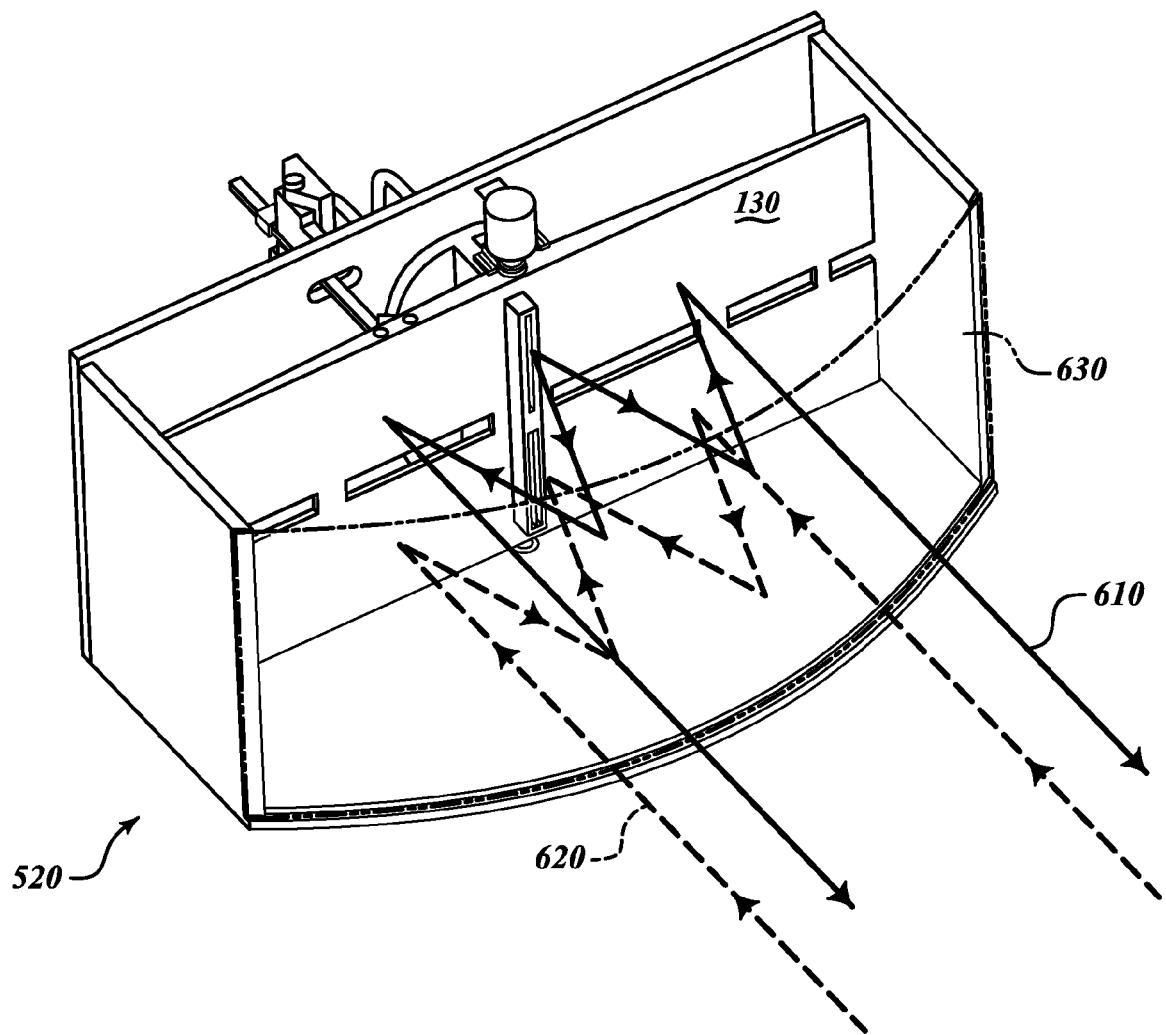
FIG. 6 is a second partial-cutaway perspective view of an antenna assembly according to an embodiment of the invention.

Referring to FIG. 6, a transmitted horizontal polarized radar-signal wave (represented by arrow set 610) radiates from feedhorn 510, placed at the focal point of a parabolic reflector 630, bounces off of the parabolic reflector 630 toward the reflector panel 130, is reflected and twisted by the panel 130 as a vertical polarized wave, and is finally radiated out through the parabolic reflector 630. The transmitted radar signal (now represented by arrow set 620) reflects off an object, comes back to the antenna 520, reflects off of the reflector panel 130, then reflects off the parabolic reflector 630, and is then focused on the receiver feedhorn 510.

Figure 7:
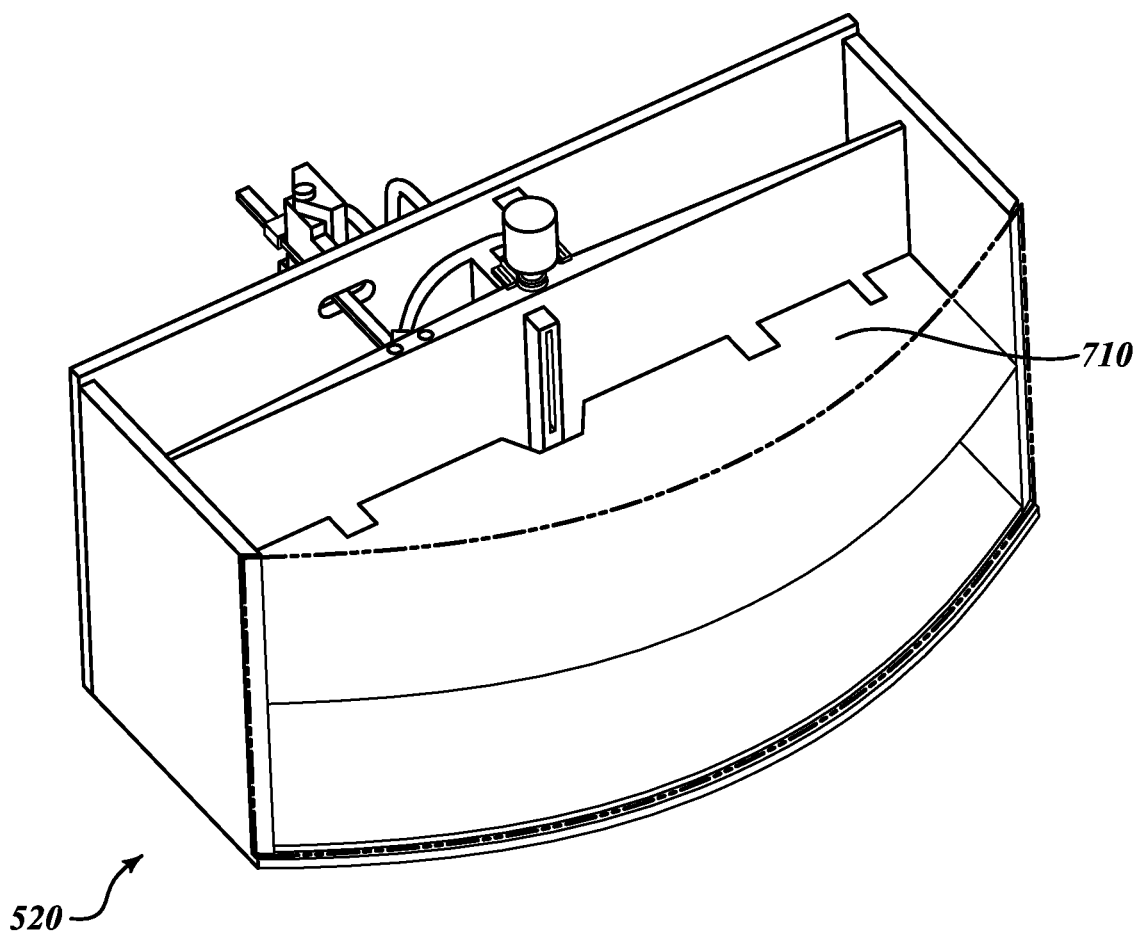
FIG. 7 is a third partial-cutaway perspective view of an antenna assembly according to an embodiment of the invention.

As illustrated in FIG. 7, the antenna 520 may further include a center sheet 710 that serves to separate the region between the reflector panel 130 and parabolic reflector 630 into upper and lower chambers, thereby separating the respective fields of transmission and reception associated with the feedhorn 510. As such, the panel 130 may include one or more slots 530 to accommodate the sheet 710 during rotation of the panel 130.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A reflector assembly implementable in a scanning antenna assembly, the scanning antenna assembly having a stationary surface, the reflector assembly comprising:
a support assembly fixedly attached to the stationary surface;
a substantially planar first reflector panel coupled to the support assembly so as to enable rotation of the first reflector panel about a central axis of the first reflector panel;
an actuator assembly comprising a single translating arm coupled to the first reflector panel and at least one motor attached to the single translating arm, wherein translational motion of the arm relative to the stationary surface caused by the at least one motor is operable to rotate the first reflector panel about the central axis back and forth through a predetermined angular range at a predetermined frequency, wherein the single translating arm passes through the stationary surface with the at least one motor being connected to the single translating arm on an opposite side of the stationary surface from the substantially planar reflector panel; and
a controller coupled to the actuator assembly and configured to control at least one of the angular position and the rotation frequency of the first reflector panel,
wherein the first reflector panel is configured to receive a radar-transceiver feedhorn.

2. The reflector assembly of claim 1 wherein the translating arm is piezoelectrically driven by the at least one motor.

3. The reflector assembly of claim 1 wherein the controller comprises an angular positional feedback optical encoder.

4. The reflector assembly of claim 1 wherein the controller is mounted to the support assembly.

5. The reflector assembly of claim 1 wherein the at least one motor comprises a plurality of piezoelectric motors.

6. The reflector assembly of claim 1, wherein the first reflector panel is coupled to the support assembly so as to enable rotation of the first reflector panel about only a central axis of the first reflector panel.

7. A scanning antenna, comprising:
a housing including a parabolic reflector panel having a focal region;
a transceiver feedhorn positioned within the focal region;
a support assembly fixedly attached to the housing;
a substantially planar reflector panel coupled to the support assembly so as to enable rotation of the planar reflector panel about a central axis of the planar reflector panel; and
an actuator assembly comprising at least one motor and a single translating arm coupled to the planar reflector panel, wherein the single translating arm passes through the housing with the at least one motor being connected to the single translating arm on an opposite side of the housing from the substantially planar reflector panel, wherein translational motion of the arm caused by the at least one motor is operable to rotate the planar reflector panel about the central axis back and forth through a predetermined angular range at a predetermined frequency.

8. The antenna of claim 7 wherein the translating arm is piezoelectrically driven by the at least one motor.

9. The antenna of claim 7, further comprising a controller coupled to the at least one motor and configured to control at least one of the angular position and the rotation frequency of the planar reflector panel.

10. The antenna of claim 9 wherein the controller comprises an angular positional feedback optical encoder.

11. The antenna of claim 9 wherein the controller is mounted to the support assembly.

12. The antenna of claim 7 wherein the planar reflector panel is configured to receive the transceiver feedhorn.

13. The antenna of claim 7 wherein the at least one motor comprises a plurality of piezoelectric motors.

14. The antenna of claim 7, wherein the reflector panel is coupled to the support assembly so as to enable rotation of the reflector panel about only a central axis of the reflector panel.

* * * * *

UNITED STATES PATENT AND TRADEMARK OFFICE
CERTIFICATE OF CORRECTION

PATENT NO. : 8,502,744 B2
APPLICATION NO. : 12/211622
DATED : August 6, 2013
INVENTOR(S) : Shih et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this
Seventeenth Day of February, 2015

Michelle K. Lee
*Deputy Director of the United States Patent and Trademark Office*